United States Patent
Cochran et al.

(10) Patent No.: US 11,010,851 B2
(45) Date of Patent: May 18, 2021

(54) DISTRIBUTION OF AERIAL VEHICLE TRANSPORT CAPACITY BASED ON ITEM-PROVIDER PERFORMANCE METRICS

(71) Applicant: Wing Aviation LLC, Mountain View, CA (US)

(72) Inventors: Theran Cochran, Tucson, AZ (US); Matthew Nubbe, Santa Clara, CA (US); Kevin Jenkins, Dixon, CA (US)

(73) Assignee: Wing Aviation LLC, Mountain View, CA (US)

( * ) Notice: Subject to any disclaimer, the term of this patent is extended or adjusted under 35 U.S.C. 154(b) by 725 days.

(21) Appl. No.: 15/852,872

(22) Filed: Dec. 22, 2017

(65) Prior Publication Data
US 2019/0197643 A1  Jun. 27, 2019

(51) Int. Cl.
*G06Q 50/28* (2012.01)
*B64C 39/02* (2006.01)
*G06Q 10/06* (2012.01)

(52) U.S. Cl.
CPC ........... *G06Q 50/28* (2013.01); *B64C 39/024* (2013.01); *G06Q 10/06315* (2013.01);
(Continued)

(58) Field of Classification Search
CPC .. G06Q 50/28; G06Q 50/30; G06Q 10/06311; G06Q 10/083; G06Q 10/0833; G06Q 10/06; G06Q 10/06315; G06Q 10/06393; B64C 39/024; B64C 2201/104; B64C 2201/108; B64C 2201/128; B64C 2201/021; B64C 2201/042; B64C 2201/126; B64C 2201/20;
(Continued)

(56) References Cited

U.S. PATENT DOCUMENTS

| 9,384,668 B2 * | 7/2016 | Raptopoulos ........ G06Q 10/083 |
| 9,881,022 B2 * | 1/2018 | Ubhi .................... G08G 5/0086 |

(Continued)

OTHER PUBLICATIONS

Goggle Inside AdWords, https://adwords.googleblog.com/2009/03/Introduction-to-ad-auction.html, Dec. 22, 2017, 4 pages.
(Continued)

*Primary Examiner* — Richard A Goldman
(74) *Attorney, Agent, or Firm* — McDonnell Boehnen Hulbert & Berghoff LLP

(57) ABSTRACT

Disclosed herein are methods and systems that can help an aerial transport service provider (ATSP) determine how to distribute and redistribute unmanned aerial vehicles (UAVs) amongst a plurality of UAV deployment stations located throughout a geographic area. In accordance with example embodiments, the ATSP system can take one or more performance metrics for item providers into account when determining how much UAV transport capacity to allocate to different item providers for a given time period. The ATSP can then determine how to distribute UAVs amongst different UAV nests in advance of and/or during the given time period, such that each item provider's allocated UAV transport capacity is available from the UAV nest or nest(s) that serve each item provider during the given time period.

23 Claims, 10 Drawing Sheets

(52) U.S. Cl.
CPC .. *G06Q 10/06393* (2013.01); *B64C 2201/104* (2013.01); *B64C 2201/108* (2013.01); *B64C 2201/128* (2013.01)

(58) Field of Classification Search
CPC ........ B64C 2201/206; B64C 2201/141; B64C 2201/14; G08G 5/0069; G08G 5/0034; G08G 5/0008; G08G 5/0021; G08G 5/003
USPC ...................................................... 701/3, 25
See application file for complete search history.

(56) References Cited

U.S. PATENT DOCUMENTS

| | | | |
|---|---|---|---|
| 10,552,773 B1* | 2/2020 | Shah | G06N 20/00 |
| 2003/0033179 A1* | 2/2003 | Katz | G06Q 10/0631 |
| | | | 705/7.12 |
| 2006/0229996 A1* | 10/2006 | Keithley | G06Q 30/06 |
| | | | 705/75 |
| 2010/0114790 A1* | 5/2010 | Strimling | G06Q 30/06 |
| | | | 705/330 |
| 2011/0246274 A1* | 10/2011 | Mesaros | G06Q 30/0217 |
| | | | 705/14.19 |
| 2012/0265590 A1* | 10/2012 | Mesaros | G06Q 30/0206 |
| | | | 705/14.13 |
| 2014/0032034 A1* | 1/2014 | Raptopoulos | G05D 1/0088 |
| | | | 701/25 |
| 2015/0081343 A1* | 3/2015 | Streebin | G06Q 40/08 |
| | | | 705/4 |
| 2015/0379874 A1* | 12/2015 | Ubhi | G05D 1/106 |
| | | | 701/3 |
| 2016/0292403 A1* | 10/2016 | Gong | G08G 5/0078 |
| 2016/0292798 A1* | 10/2016 | Berry | G06Q 10/0832 |
| 2016/0328669 A1* | 11/2016 | Droege | G06Q 10/06311 |
| 2016/0335593 A1* | 11/2016 | Clarke | G06Q 10/0833 |
| 2016/0357183 A1* | 12/2016 | Shaw | G05D 1/0027 |
| 2017/0090484 A1* | 3/2017 | Obaidi | B64D 47/08 |
| 2017/0116566 A1* | 4/2017 | Walton | G06Q 10/04 |
| 2017/0249847 A1* | 8/2017 | Marueli | G01C 21/343 |
| 2017/0255198 A1* | 9/2017 | Rodriguez | G05D 1/0088 |
| 2017/0334561 A1* | 11/2017 | Sopper | B64D 1/22 |
| 2017/0337827 A1* | 11/2017 | Chambers | G08G 5/003 |
| 2017/0353947 A1* | 12/2017 | Ang | H04L 5/0048 |
| 2018/0137454 A1* | 5/2018 | Kulkarni | G08G 5/0034 |
| 2018/0158020 A1* | 6/2018 | Khasis | G01C 21/3453 |
| 2018/0218454 A1* | 8/2018 | Simon | H04L 9/3239 |
| 2018/0260769 A1* | 9/2018 | Ahmed | G06F 16/2379 |
| 2018/0315148 A1* | 11/2018 | Luo | G06Q 50/30 |
| 2018/0336510 A1* | 11/2018 | DaCosta | G06Q 30/0633 |
| 2018/0356239 A1* | 12/2018 | Marco | G06Q 50/30 |
| 2019/0064796 A1* | 2/2019 | Shaw | G05D 1/0027 |
| 2019/0114564 A1* | 4/2019 | Ferguson | G06Q 10/06312 |
| 2019/0193856 A1* | 6/2019 | Prager | B64C 39/02 |
| 2019/0193952 A1* | 6/2019 | Zevenbergen | B65G 47/91 |
| 2019/0196512 A1* | 6/2019 | Blake | G06Q 10/06315 |
| 2019/0197643 A1* | 6/2019 | Cochran | G06Q 50/28 |
| 2019/0204992 A1* | 7/2019 | Bowden | G01C 21/343 |
| 2019/0278897 A1* | 9/2019 | Zhang | G06Q 50/30 |
| 2019/0325467 A1* | 10/2019 | Perry | G06K 9/00657 |
| 2020/0005205 A1* | 1/2020 | Tsur | G06Q 10/0631 |
| 2020/0005226 A1* | 1/2020 | Sikka | G06Q 10/087 |
| 2020/0082315 A1* | 3/2020 | Crapis | G06Q 10/06311 |
| 2020/0250600 A1* | 8/2020 | Gupta | G06N 7/005 |
| 2020/0250616 A1* | 8/2020 | Streebin | G06Q 10/08345 |
| 2020/0250737 A1* | 8/2020 | Wallace | H04W 4/23 |

OTHER PUBLICATIONS

International Searching Authority, International Search Report and Written Opinion dated Apr. 24, 2019, issued in connection with International Patent Application No. PCT/US2018/067390, filed on Dec. 21, 2018, 12 pages.

International Bureau, International Preliminary Report on Patentability dated Jul. 2, 2020, issued in connection with International Patent Application No. PCT/US2018/067390 filed on Dec. 21, 2018, 9 pages.

International Bureau, International Preliminary Report on Patentability dated Jul. 2, 2020, issued in connection with International Patent Application No. PCT/US2018/063276 filed on Nov. 30, 2018, 10 pages.

International Searching Authority, International Search Report and Written Opinion dated Feb. 27, 2019, issued in connection with International Patent Application No. PCT/US2018/063276, filed on Nov. 30, 2018, 15 pages.

* cited by examiner

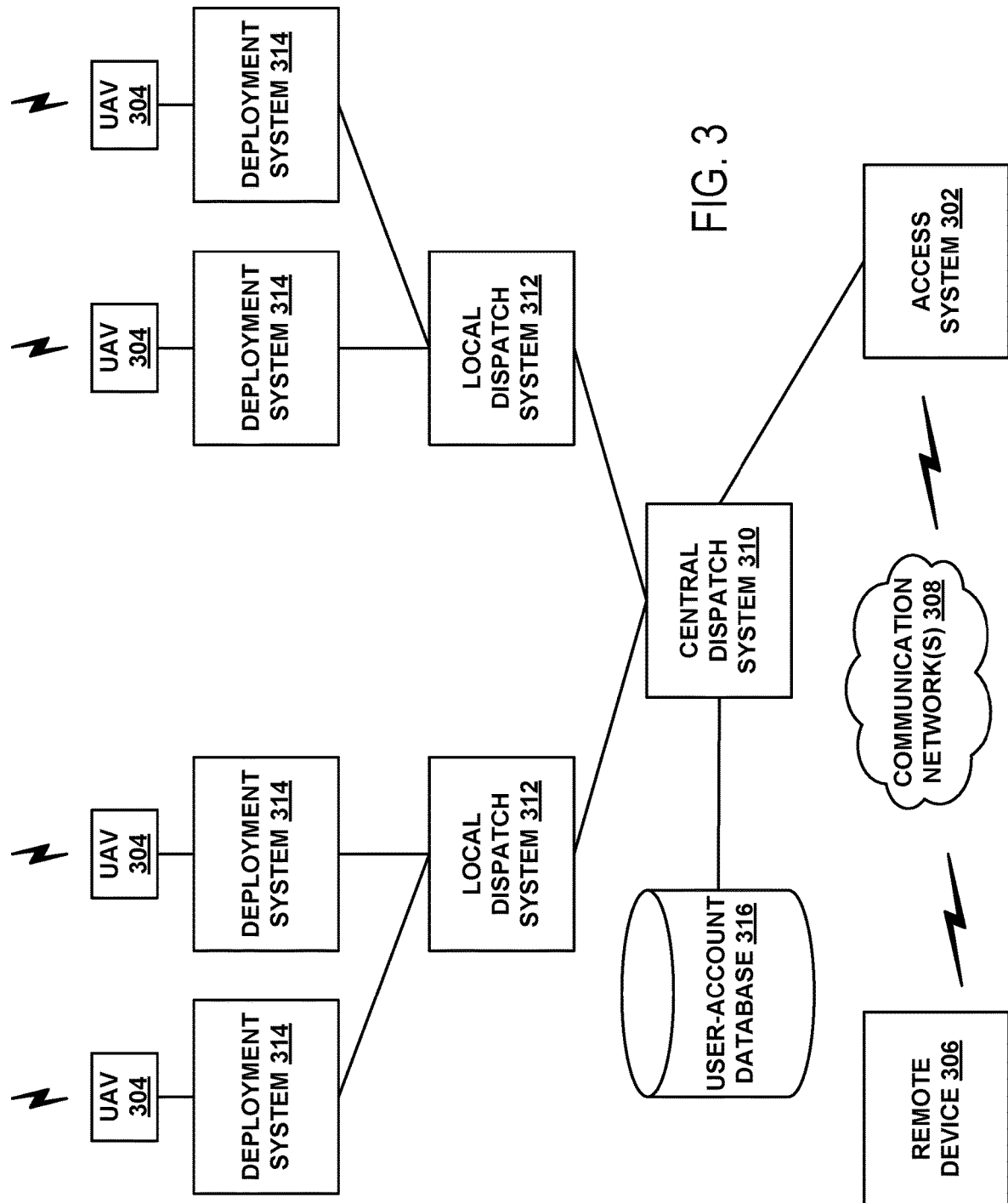

DISTRIBUTION OF AERIAL VEHICLE TRANSPORT CAPACITY BASED ON ITEM-PROVIDER PERFORMANCE METRICS

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

An aerial transport service provider (ATSP) can provide an aerial delivery service to third-party item-providers. In order to provide such transport service throughout a geographic area that is larger than that which can be served by a single unmanned aerial vehicles (UAV) deployment station, an ATSP may install deployment infrastructure (e.g., a UAV nest) at a number of different locations in the larger geographic area. In such arrangements, the demand for UAV transport service in different areas served by different UAV nests can change relative to one another over time in (e.g., due to changing demand from specific item provider(s) served by each UAV nest). To more efficiently utilize its UAVs, an ATSP may dynamically distribute and redistribute unmanned aerial vehicles (UAVs) amongst UAV nests, to change the geographic distribution of UAV transport city according to location-specific changes in demand.

In this context, example embodiments can be implemented by an ATSP in order to encourage and/or reward certain behavior by item providers via the manner in which the ATSP distributes UAV capacity. More specifically, example methods take one or more performance metrics for item providers into account when determining how much UAV transport capacity to allocate to different item providers for a given time period. To do so, the ATSP may receive offers or bids for UAV transport capacity from item providers, use various performance metrics to determine a ranking for the item providers, and take the ranking into account when determining how much UAV transport to allocate to each item provider. The ATSP can then distribute UAVs amongst different UAV nests in advance of and/or during the given time period, such that each item provider's allocated UAV transport capacity is available from the UAV nest or nest(s) that serve the item provider. Notably, by taking performance metrics into account, the resulting distribution of UAV transport capacity might favor an item provider with a lower offer, but better performance metrics, over another item provider with a higher offer, but worse performance metrics.

More generally, in one aspect, an example method involves an ATSP computing system: (i) receiving a plurality of item-provider submissions, wherein each item-provider submission indicates a corresponding item-provider account and a respective quantitative measure for UAV transport service for an item-source location at a future time; (ii) for each item-provider submission: (a) determining a performance metric based on past usage of UAV transport services associated with corresponding item-provider account; and (b) determining a comparative measure for the item-provider submission using both the performance metric as a basis and the respective quantitative measure indicated by the item-provider submission; (iii) determining a ranking of the plurality of item-provider submissions based on the determined comparative measures for the plurality of item-provider submissions; and (iv) based at least in part on the ranking of the plurality of item-provider submissions, determining a distribution of the plurality of UAVs, at the future time, amongst a plurality of deployment stations at different locations in a geographic area.

In another aspect, a transport-provider computing system includes at least one communication interface operable to communicate with item-provider computing devices, at least one processor, and program instructions stored on a non-transitory computer readable medium. The program instructions are executable by the at least one processor to cause the transport-provider computing system to perform functions comprising: (i) receiving a plurality of item-provider submissions, wherein each item-provider submission indicates a corresponding item-provider account and a respective quantitative measure for UAV transport service for an item-source location at a future time; (ii) for each item-provider submission: (a) determining a performance metric based on past usage of UAV transport services associated with corresponding item-provider account, and (b) determining a comparative measure for the item-provider submission using both the performance metric as a basis and the respective quantitative measure indicated by the item-provider submission; (iii) determining a ranking of the plurality of item-provider submissions based on the determined comparative measures for the plurality of item-provider submissions; and (iv) based at least in part on the ranking of the plurality of item-provider submissions, determining a distribution of the plurality of UAVs, at the future time, amongst a plurality of deployment stations at different locations in a geographic area.

In a further aspect, another example method involves an ATSP computing system: (i) receiving a plurality of item-provider submissions, wherein each item-provider submission indicates a corresponding item-provider account from a plurality of item-provider accounts and an indication of an amount of UAV transport service for an item-source location at a future time; (ii) for each item-provider submission, determining a performance metric based on past usage of UAV transport services associated with corresponding item-provider account; (iii) determining a ranking of the plurality of item-provider submissions based on the respectively determined performance metrics for the plurality of item-provider submissions; and (iv) based at least in part on the ranking of the plurality of item-provider submissions, determining a distribution of the plurality of UAVs, at the future time, amongst a plurality of deployment stations at different locations in a geographic area.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3 is a simplified block diagram illustrating a distributed UAV system, according to example embodiments.

DETAILED DESCRIPTION

Figure 1A:
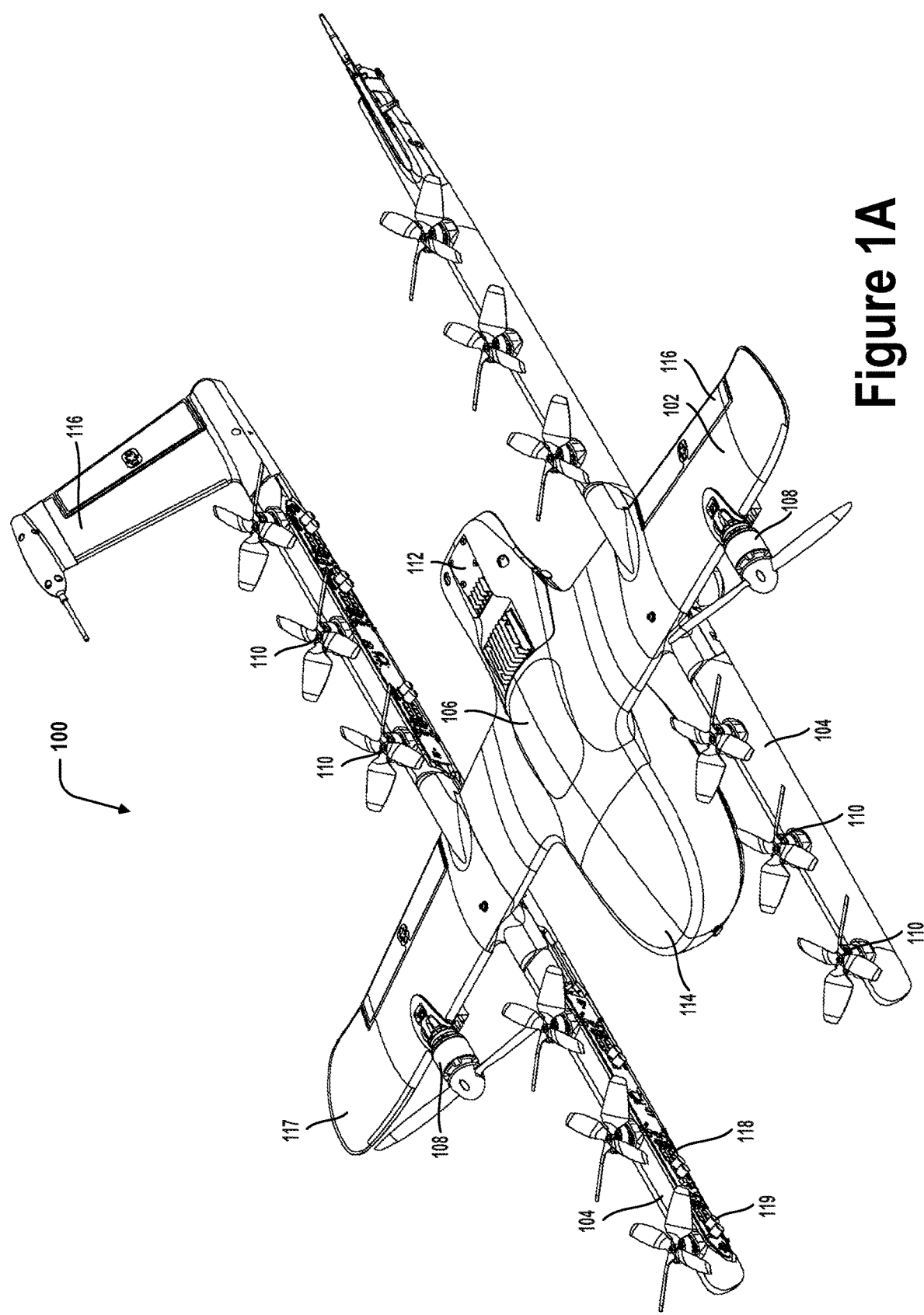
FIG. 1A is a simplified illustration of an unmanned aerial vehicle, according to example embodiments.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

As noted above, in some cases, an aerial transport service provider (ATSP) may be a separate entity from the entity or entities that provide the items being transported and/or interface with the recipients who request delivery of these items. For example, a company or entity that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

In order to provide UAV transport services to various item providers in an efficient and flexible manner, an ATSP may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

Further, in an arrangement where an ATSP provides UAV transport services to a number of different item providers located throughout a large geographic area, the ATSP can dynamically change the allocation of UAVs amongst item providers based at least in part on indications from the item providers of the amount of UAV capacity they desire at various points in time. To accomplish such dynamic allocation of UAV transport capacity, an ATSP can periodically or from time-to-time redistribute UAVs amongst a number of UAV deployment stations (which may be referred to as, e.g., UAV "hubs" or "nests"), according to time-varying levels of demand at various locations or areas within the ATSP's larger service area.

Example embodiments can be implemented to help an ATSP determine how to distribute and/or re-distribute its UAVs among various UAV nest in a manner that improves the overall quality of the item-recipient experience and/or improves the efficiency of the UAV transport service. In particular, exemplary methods utilize one or more quality metrics (also referred to herein as "performance metrics" or "performance parameters") in an effort to improve the overall UAV transport process. By utilizing such quality metrics, in addition to monetary and/or non-monetary indications of demand (e.g., bid or offer prices from item providers), to help allocate and/or distribute the UAVs for use by different item providers.

For example, an ATSP may determine a quality score for each item provider based on the item provider's performance during past UAV transport tasks with the item provider. For example, a quality score for a given item provider may be determined based on the item provider's actual utilization of pre-allocated UAV capacity, loading time for item pick-up (e.g., average loading time), metrics indicating how closely the item provider follows item loading and/or safety procedures, and/or customer experience metrics for transport tasks for the item-provider, among other possibilities.

The ATSP may then utilize the quality scores for various item providers to adjust corresponding offer prices received from the various item providers, so that UAV capacity can be distributed in a manner that prioritizes item providers having better performance metrics. For example, the offer value from an item provider having a higher quality score may be increased by a greater amount or percentage, as compared to the offer value from a second item provider having a lower quality score (which could be increased by less, or even reduced, based on the second item provider's quality score).

When performance metrics are taken into account in the geographic distribution of UAV capacity, it is possible that an item provider with a comparatively lower offer for UAV transport services, but a comparatively higher quality score, will be prioritized over another item provider with a comparatively higher offer for UAV transport services, but a comparatively lower quality score. In practice, this may lead to the seemingly counterintuitive result of allocating some UAV transport capacity to item providers that are paying less than the amount or rate offered by other item providers, due to the consideration of the item providers' respective performance parameters. However, by rewarding item providers for behavior that results in better performance metrics (e.g., excellent customer service, more efficient usage of the UAVs during deliveries, more efficient usage of pre-allocated UAV capacity, implementing beneficial employee training, etc.), the ATSP can secure repeat customers and grow the overall market size and demand for UAV transport services. Thus, by giving up some potential for short-term profits, example embodiments may help to improve long-term viability of a UAV transport service provider's operations. Of course, it should be understood that the above and other possible benefits of example embodiments described herein are provided for explanatory purposes, and are not intended to be limiting.

Note that herein, a "transport task" can generally involve a UAV picking up an item or item from one location (e.g., a source location specified by the item provider), delivering the item or items to another location, and returning to a base location (e.g., a UAV nest or charging station), where the UAV can recharge and/or be readied for its next assigned transport task. Further, multi-delivery transport tasks are possible, which can include additional flight legs in order deliver item(s) at multiple delivery locations, before returning to the base location. More generally, a transport task may be any sequence of flights implemented by a given UAV to complete a particular task, such a picking up and delivering an item or items.

Further, it should be understood that an "item providers" may include any entity that has items to be delivered to any type of "recipient." Item recipients may be any entities or locations capable of receiving delivery of an item, such as merchants, vendors, dealers, retailers, seller, shippers, and laypersons, among other possibilities.

In another aspect, the allocation or assignment of a certain number of UAVs to each of a plurality of UAV nests, as well as to pre-staging locations associated with the nests or located nearby the nests, at a given time may be referred to herein as the "distribution" of UAVs or the "distribution of UAV capacity" (with "UAV capacity" referring to the fleet or set of UAVs that are available and/or their collective ability to provide transport services at a given time). In order achieve a desired distribution of UAVs at a certain time, ATSP control system 401 can pre-emptively instruct certain UAVs to move between UAV nests and/or between pre-staging locations. By doing so, an ATSP control system can redistribute UAV capacity according to location-specific changes in demand.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
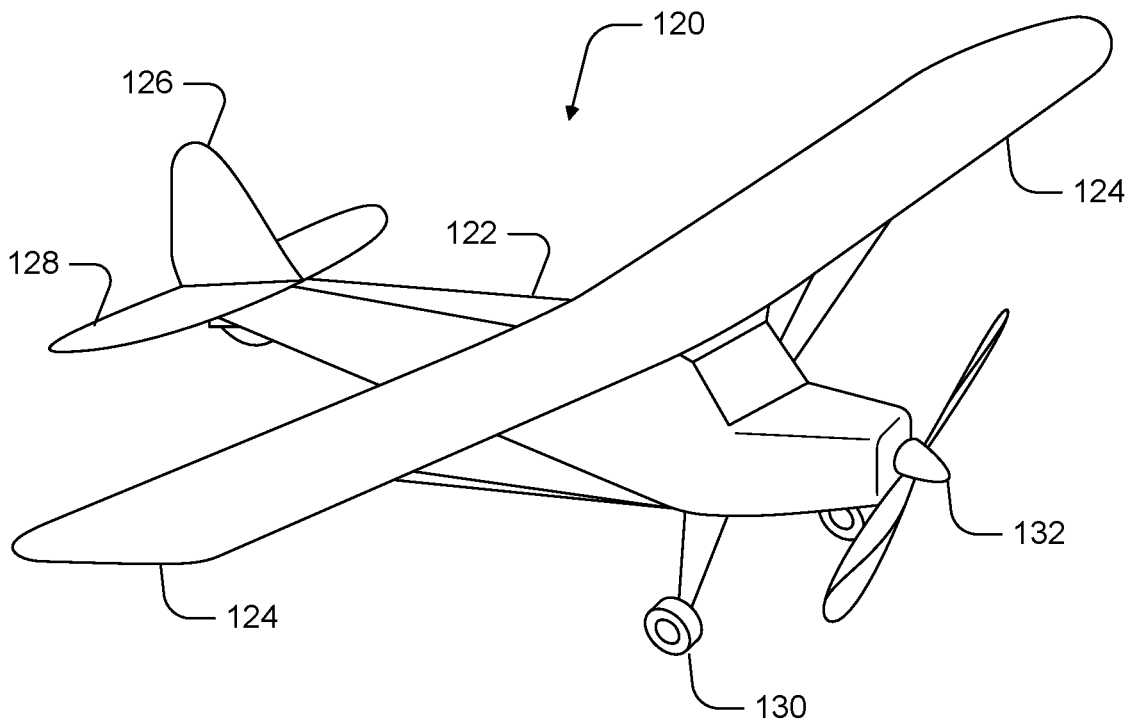
FIG. 1B is a simplified illustration of an unmanned aerial vehicle, according to example embodiments.

Similarly, FIG. 1B shows another example of a UAV 120. The UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
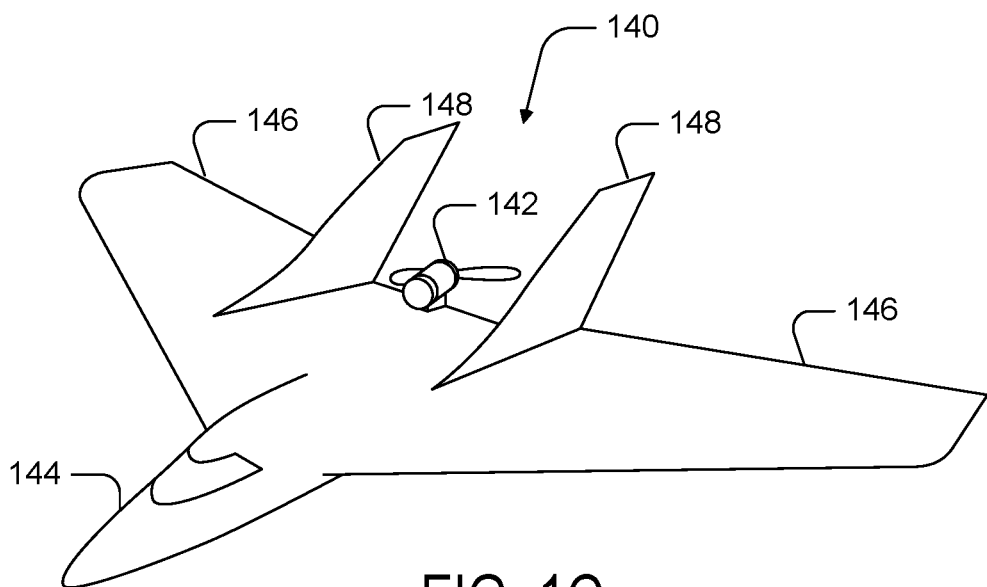
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
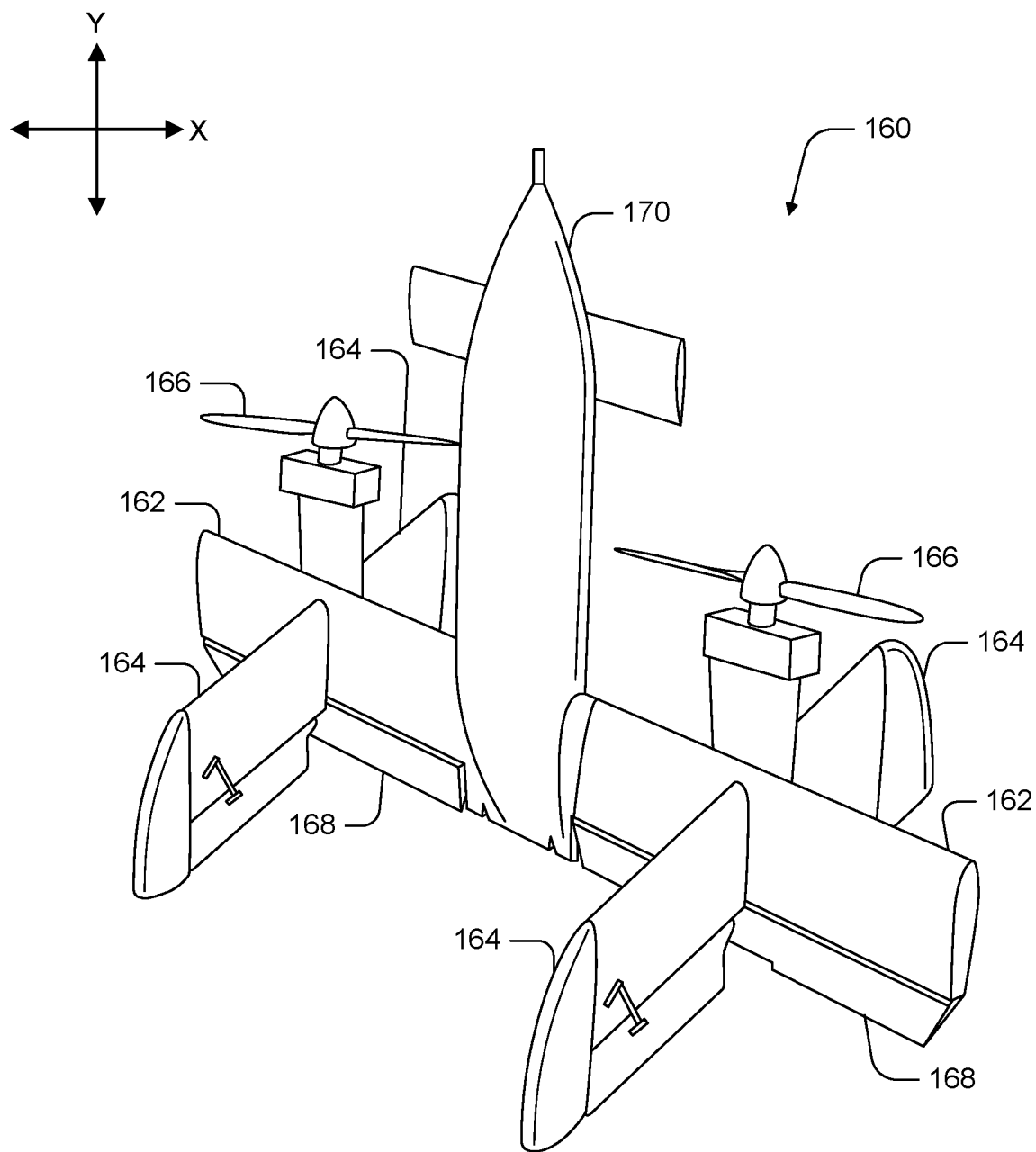
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
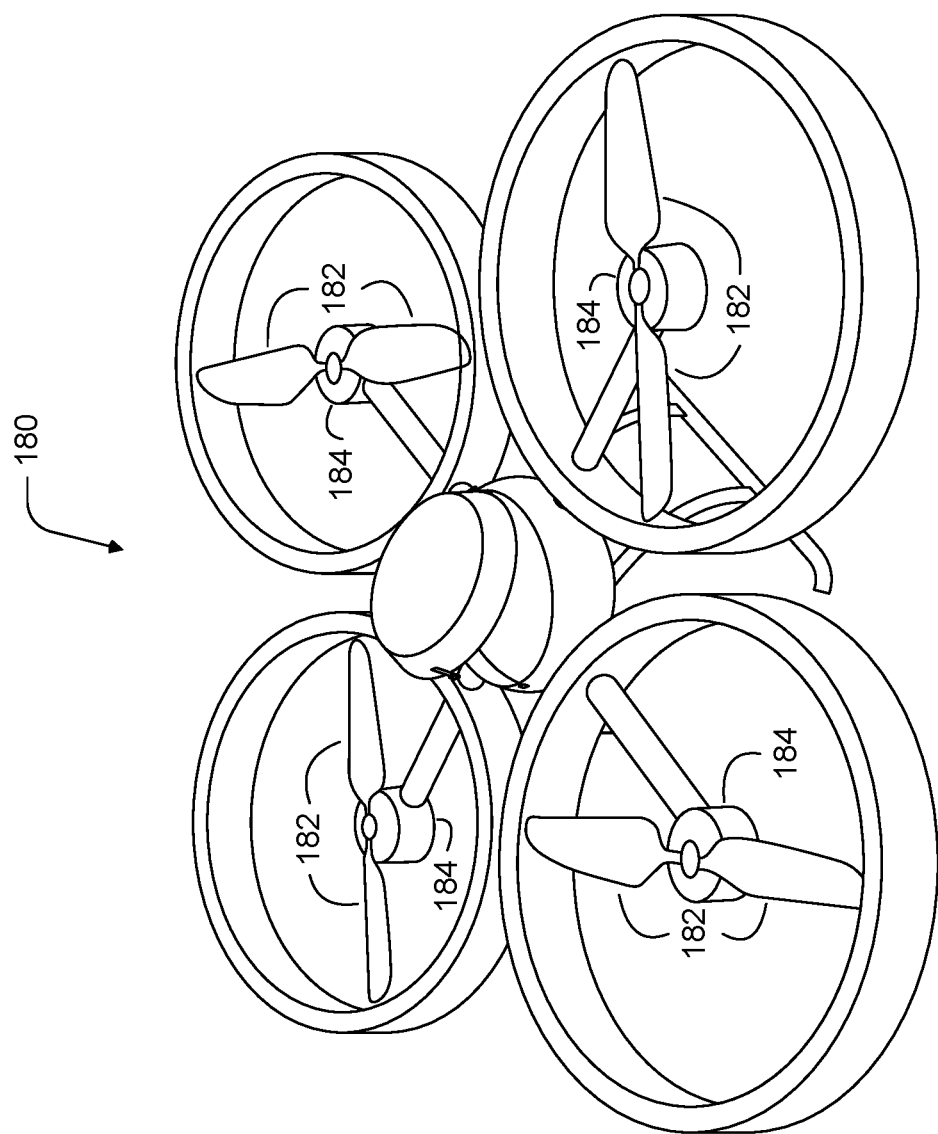
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
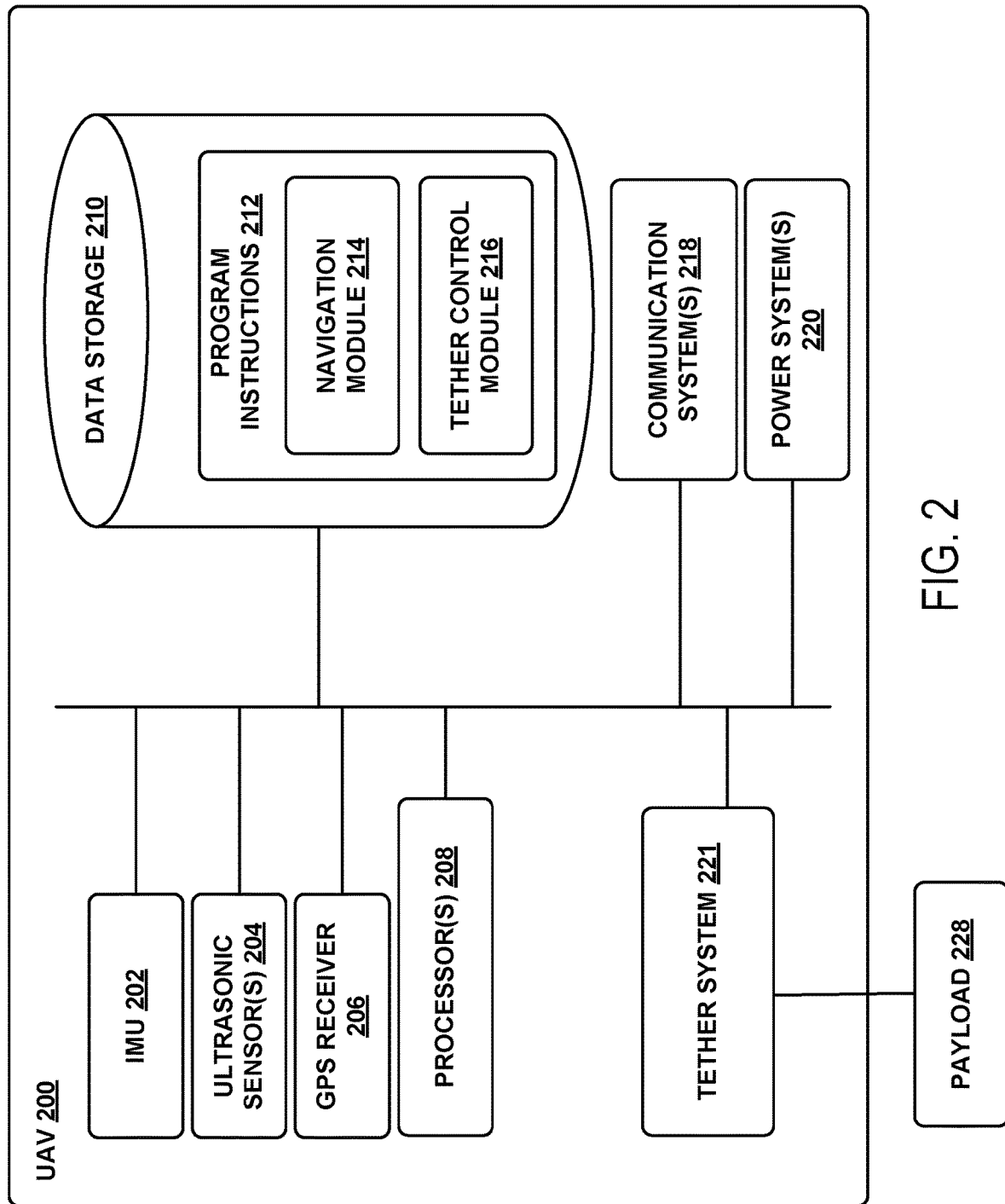
FIG. 2 is a simplified block diagram illustrating components of an unmanned aerial system, according to example embodiments.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

UAV systems may be implemented in order to provide various UAV-related services. In particular, UAVs may be provided at a number of different launch sites with infrastructure for communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. A deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, an entity (e.g., a person or business) may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP to deliver, can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

As noted above, a UAV transport service provider may be a separate entity from the entity or entities that provide the items being transported and/or interface with the recipients who request delivery of these items.

Figure 4A:
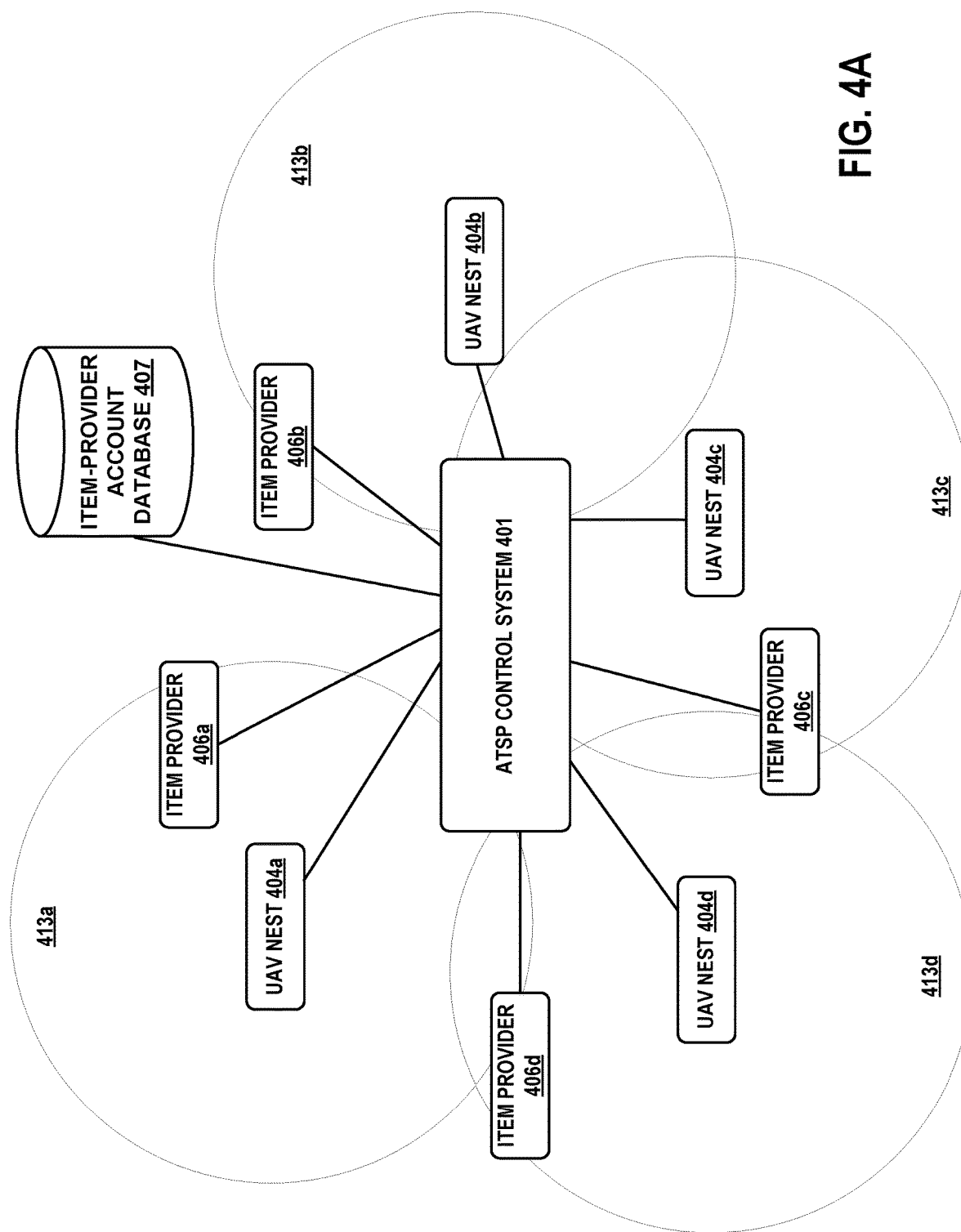
FIG. 4A is a block diagram showing an example arrangement for a transport provider system, according to example embodiments.

FIG. 4A is a block diagram showing an example arrangement for a transport provider system 402, which coordinates UAV transport services for a plurality of item providers that can be located remotely from the service provider's UAV deployment stations (e.g., UAV nests). As shown, an aerial transport service provider (ATSP) 402 may be communicatively coupled to UAV nests 404a to 404d, and communicatively coupled to item-provider computing systems 406a to 406d.

Each UAV nest 404a to 404d provides infrastructure where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d can take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. (ATSP 402 may store data for item-provider accounts in an item-provider account database 407. In practice, a given item-provider computing system 406a to 406d may take the form of remote devices (e.g., such as one or more remote devices 306 described in reference to FIG. 3), which have all logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers 406a-406d, rather than permanently assigning each UAV to a particular item provider. As such, the particular UAV or UAVs that carry out transport tasks for a given third-party item provider may vary over time. The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers.

In a further aspect, each UAV nest 404a-404d is shown as having a corresponding service area 413a-413d, respectively. The service area of a given UAV nest may be defined, at least in part, by the flight range(s) of the UAVs that are located at or scheduled to be located at the UAV nest.

In some implementations, the service area 413a-413d for each UAV nest 404a-404d may be a fixed size, which does not vary over time. In other implementations, the size of a service area 413a-413d for a given UAV nest 404a-404d could vary over time based on various factors, such as demand for UAV transport services in the service area and/or nearby service areas, the number and/or capabilities of UAVs allocated to operate from the UAV nest, and/or the number and/or characteristics of item providers located near to the UAV nest, among other possibilities.

Additionally or alternatively, the size of a service area 413a-413d for a given UAV nest 404a-404d could vary on an order-by-order basis, and/or vary by item provider. More specifically, when a transport task involve three or more flight legs (e.g., a flight from the UAV nest to the item provider for pick-up, a flight from the item provider to a delivery location, and a return flight), there may be two or more flight legs before delivering an item. Thus, the evaluation of whether or not a given item provider is within the service area of a UAV nest for a given transport task depends on a combination of the distance from the UAV nest to the item pick-up location and the distance from the pick-up location to the delivery location. As a result, a given UAV nest may be able to serve a given item provider for one transport task, but not for another. In this context, it is possible that the notion of a defined "service area" may not be utilized at all. Instead, a service provider may simply evaluate whether a UAV transport task can be implemented on a task-by-task basis, given all of the parameters for completion of the task.

Since certain item providers can only be served by (or are better served by) a certain UAV nest or nests, and because demand for UAV transport services can vary between item providers, an ATSP control system 401 for a given area may implement an ongoing process to distribute and redistribute UAVs amongst the UAV nests 404a-404d that collectively serve the given area. In particular, the ATSP control system 401 may continually, periodically, or from time-to-time evaluate demand and/or other factors for each item provider 406a-406d, and determine a respective number of UAVs that are desirable at each UAV nest 404a-404d, in order to meet the demand for UAV transport services in the respective area that is served each UAV nest 404a-404d. Additionally or alternatively, the ATSP control system 401 could determine a respective number of UAVs that are desirable at each UAV nest 404a-404d such that UAV nests 404a-404d can collectively meet demand for UAV transport services in the larger area collectively served by the UAV nests 404a-404d.

In a further aspect, some ATSPs may provide for a system that further includes pre-staging locations and/or pre-staging infrastructure at locations that are closer to certain item providers than the closest UAV nest. In such arrangements, UAV nests may still serve as a "home" for UAVs, where UAVs can be serviced, re-charged, and so on. However, to provide more rapid service to a certain item provider or group of item providers, an ATSP may additionally or alternatively offer UAV transport service by UAVs deployed from pre-staging locations. Each pre-staging location may be co-located with a certain item provider, or located closer to a certain item provider or group of item providers than the nearest UAV nest.

In such arrangements, when an item provider requests a UAV for a transport task, the ATSP may dispatch a UAV pre-staging location that is near to or co-located at the item provider's location (or an item-source location designated by the item provider, which may help to reduce the delay due to the extra flight leg to pick up the item(s) from the item provider. And, in the scenario where a UAV is pre-staged at the item-source location, delay for the extra flight leg to the item provider may be eliminated entirely.

In some embodiments, UAVs may be pre-staged proactively, before specific requests for transport tasks are received, based on, e.g., predicted or estimated demand for UAV capacity at various pre-staging locations. In some cases, an ATSP may pre-emptively locate UAVs without payloads or with empty payload containers near item providers in anticipation of the item providers requesting the UAVs for transport tasks. Additionally or alternatively, an ATSP may pre-stage loaded UAVs near item recipients in anticipation of the item recipients ordering particular payload items.

Figure 4B:
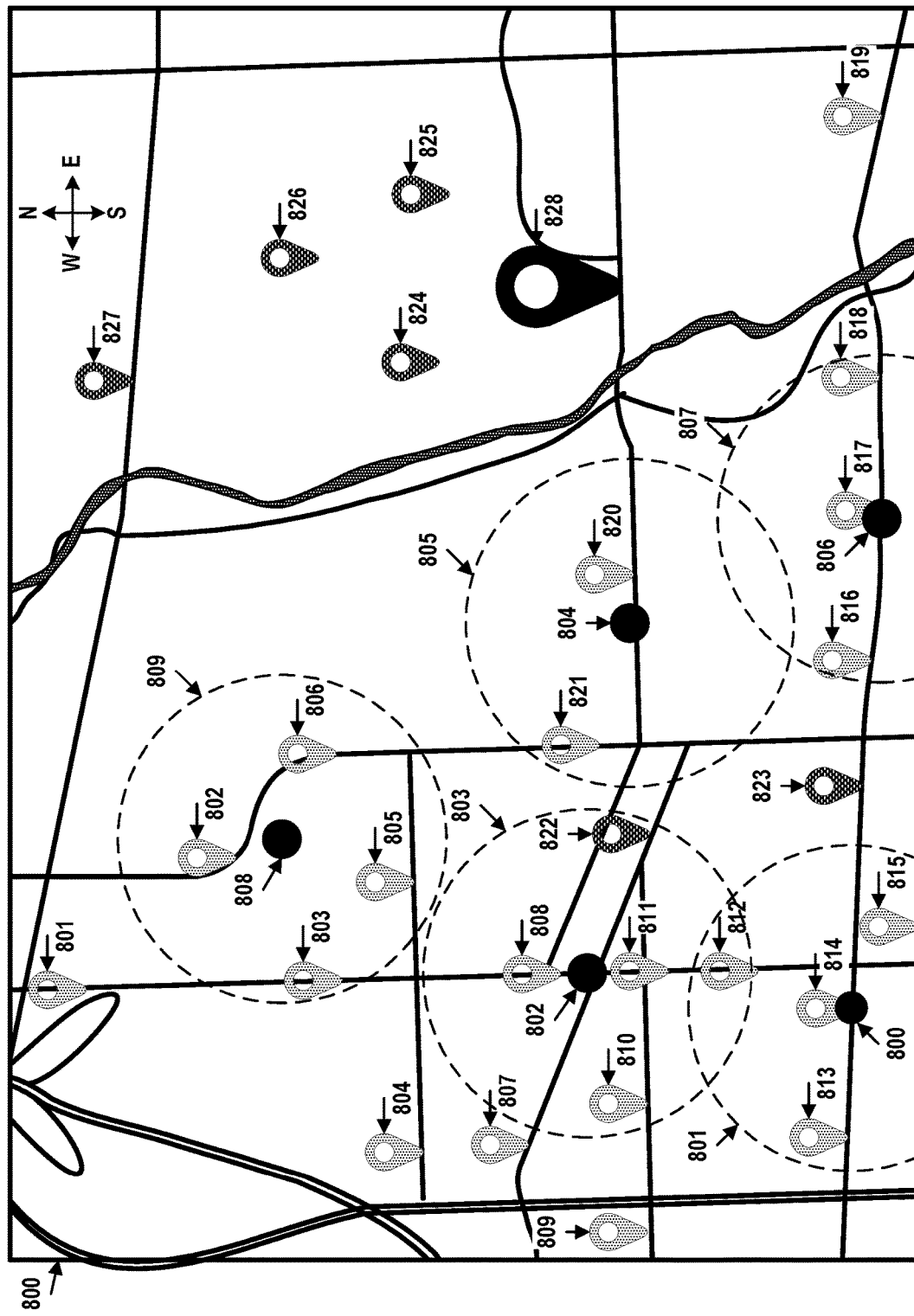
FIG. 4B illustrates a geographic distribution of an aerial transport provider system, in accordance with example embodiments.

FIG. 4B is a simplified illustrations showing an example distribution of UAVs among pre-staging locations 800, 802, 804, 806, and 808 within geographic area 800. These pre-staging locations may include any combination of environmental features (e.g., trees, lampposts, cell towers, etc.) and/or purpose-built landing structures (with or without battery chargers and/or other features). Pre-staging locations 800 and 806, for example, may be landing structures installed on buildings associated with item providers indicated by markers 814 and 817. Pre-staging locations 802, 804, and 808 may be landing structures or environmental features near item providers. Each of pre-staging locations 800, 802, 804, 806, and 808 may contain multiple UAVs. It is also possible that some pre-staging locations could be designed for a single UAV.

Additionally, each of pre-staging locations 800, 802, 804, 806, and 808 may be located so as to serve at least one item provider. For example, pre-staging location 800 may be located near to and operable to provide service (for at least some transport task) to item providers indicated by markers 812, 813, 814, and 815, pre-staging location 802 may be located near to and operable to provide service (for at least some transport task) to providers indicated by markers 808, 810, 811, and 812, as well as the item recipient indicated by marker 822, pre-staging location 804 is located near to and operable to provide service (for at least some transport task) to item providers indicated by markers 820 and 821, pre-staging location 806 is located near to and operable to provide service (for at least some transport tasks) to item providers indicated by markers 816, 817, and 818, and pre-staging location 808 is located near to and operable to provide service (for at least some transport tasks) to item providers indicated by markers 802, 803, 805, and 806. Additional pre-staging locations not shown in FIG. 8 may be included in geographic area 800 to accommodate, for example, item providers corresponding to markers 801, 804, 807, 807, and 819, as well as item recipients corresponding to markers 823, 824, 825, 826, and 827.

Having a certain close proximity between pre-staging locations and item providers may help an ATSP consistently respond to item provider requests, e.g., within a certain threshold amount of time. For example, an ATSP may distribute UAVs such that each of the item providers indicated by markers 812, 813, 814, and 815 may be reachable by UAVs pre-staged at pre-staging location 800 in under 30 seconds. Other examples are also possible.

In some embodiments, transport services performed by the pre-staged UAVs may be sold to the item providers at different rates than transport services performed by UAVs dispatched from the UAV nest. That is, item providers may be able to pay a premium for reducing a wait time for a UAV to arrive for payload pick-up. Additionally, in some instances, item providers that pre-order UAVs for transport tasks, and therefore allow the ATSP to more accurately schedule and configured its UAV fleet, may pay a lower rate for pre-staged UAVs that item providers that did not pre-order pre-staged UAVs.

Generally, pre-staging a UAV for an item provider may involve deploying, from the UAV nest or from another location and to the pre-staging location, an empty UAV that is not currently carrying a payload item and is thus capable of picking up a payload item from the item provider. On the other hand, pre-staging the UAV for an item recipient may involve deploying, to the pre-staging location, the UAV loaded with a payload item that the item recipient is predicted to order within a future time window. This may involve sending the UAV to an item provider to pick up the payload item predicted to be ordered before deploying the UAV to the pre-staging location. In one example, the ATSP may predict that the item recipient is predicted to order the payload item and, in response, purchase and pick up the payload item from an item provider. The ATSP may then pre-stage the UAV near the item recipient with the purchased payload item, and wait for the item recipient to order the item from the ATSP. Alternatively, the item provider may predict that the item recipient is predicted to order the payload item, and may order from the ATSP a UAV to be pre-staged with the item near the item recipient. In some instances, the ATSP and the item provider may coordinate in other ways to allow for pre-staging of payloads near item recipients in anticipation of the item recipients' orders.

VI. DYNAMICALLY REDISTRIBUTING UAV CAPACITY AMONGST UAV NESTS AND/OR PRE-STAGING LOCATIONS

Figure 5:
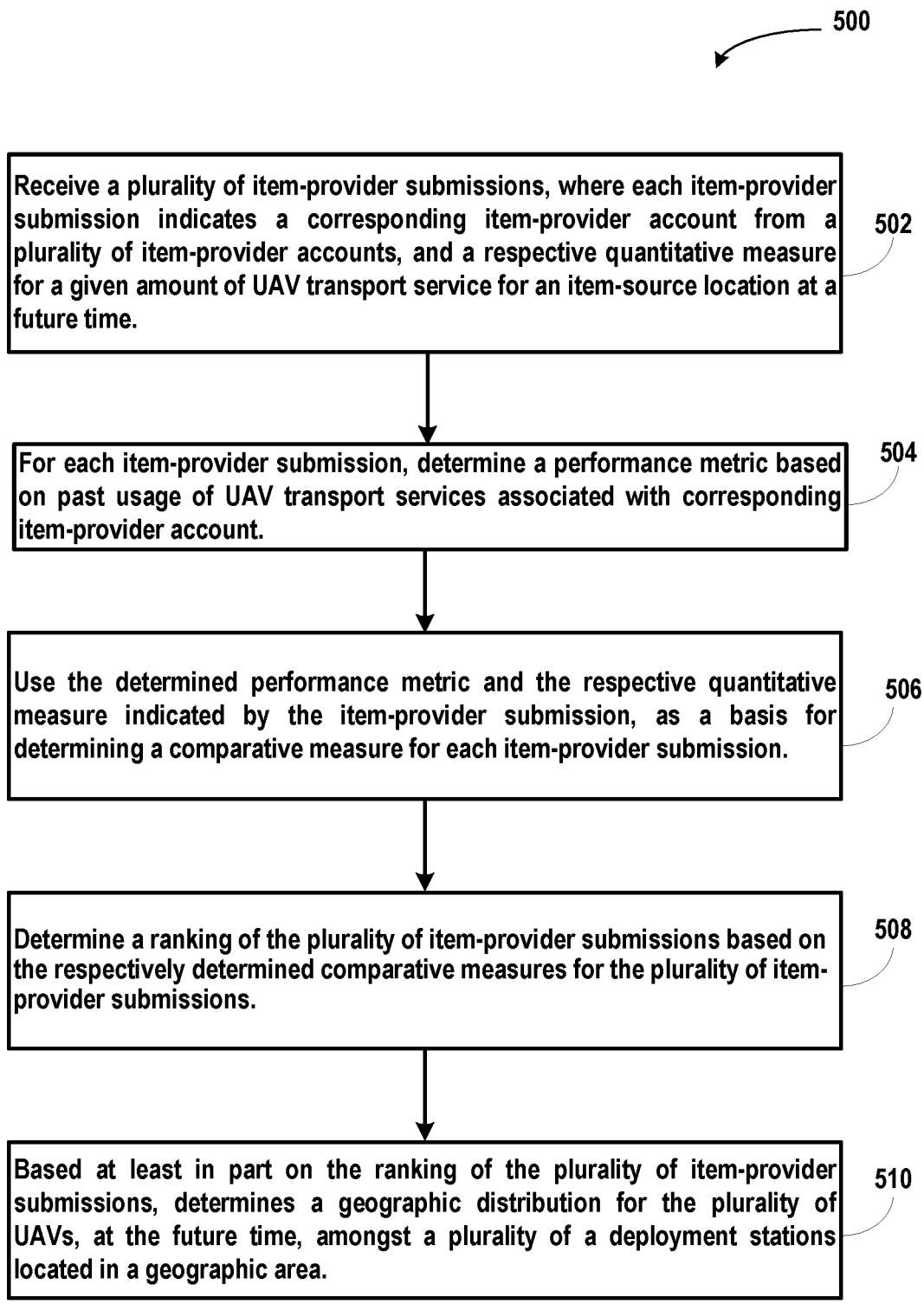
FIG. 5 is a flow chart illustrating a method for distributing unmanned aerial vehicles amongst a plurality of a deployment stations at different locations in a geographic area, according to exemplary embodiments.

FIG. 5 is a flow chart illustrating a method 500 for distributing unmanned aerial vehicles amongst a plurality of a deployment stations at different locations in a geographic area, according to exemplary embodiments. Method 500 may be implemented by an ATSP in order to dynamically distribute and redistribute UAVs to various UAV hubs throughout a geographic area, based on item providers' performance metrics and demand for UAV transport services (and possibly other factors as well). Method 500 is described by way of example as being implemented by an ATSP's computing system. However, it should be understood that method 500 could be implemented by other types of computing systems or combinations of multiple computing systems, without departing from the scope of the invention.

More specifically, method 500 involves an ATSP computing system receiving a plurality of item-provider submissions, wherein each item-provider submission indicates a corresponding item-provider account from a plurality of item-provider accounts, and a respective quantitative measure for UAV transport service at an item-source location at a future time, as shown by block 502. Then, for each item-provider submission, the computing system determines a performance metric based on past usage of UAV transport services associated with corresponding item-provider account, as shown by block 504. The computing system then uses both the performance metric and the respective quantitative measure indicated by the item-provider submission, as a basis for determining a comparative measure for the item-provider submission, as shown by block 506.

The computing system can then determine a ranking of the plurality of item-provider submissions based on the respectively determined comparative measures for the plurality of item-provider submissions, as shown by block 508. And, based at least in part on the ranking of the plurality of item-provider submissions, the computing system determines a geographic distribution for the plurality of UAVs, at the future time, amongst a plurality of a deployment stations located in a geographic area, as shown by block 510.

Note that in some embodiments, method 500 and other methods disclosed herein may be applied to determine how to distribute UAVs amongst pre-staging locations and/or pre-staging infrastructure located throughout a geographic area, in addition or in the alternative to determining a distribution amongst a plurality of UAV nests. Accordingly, those skilled in the art will understand that functionality and features described herein as relating to, including, or being performed by or at UAV nests, can apply equally to pre-staging locations and/or pre-staging infrastructure.

A. Item Provider Submissions

Various types of item-provider submissions may be received at block 502. Generally, a given item provider (e.g., a third-party merchant using an ATSP's UAV transport services to deliver their products to consumers and/or other businesses), may send an item-provider submission via a computing device located at or near the location or locations where the provider's item(s) will be picked up by UAV(s). An item-provider computing system could also send item-provider submissions from remote locations (separate from the associated item pick-up location(s)).

An item-provider submission may include various types of information and/or requests. In exemplary embodiments, each item-provider submission indicates a quantitative measure for a specified amount of UAV transport service. The quantitative measure could be a monetary amount or rate, a number of credits, or another type of measure. For instance, the quantitative measure could be an amount that the item provider is offering or willing to pay for a certain amount of UAV transport capacity at a given time. However, item-provider submission could also be non-monetary in nature. For example, item-provider submissions could simply indicate an amount of UAV transport capacity that the item provider expects and/or desires during a future time period, without attaching any monetary value to the requested UAV transport capacity. Other examples are also possible.

In a further aspect, an item-provider submission can include one or more time parameters related to a request for UAV transport service. More specifically, an item-provider submission can specify time parameters that define, modify, or otherwise relate to the quantitative measure indicated in the same item-provider submission. For example, an item-provider submission could specify, a time period (e.g., with a start and stop time) during which a certain amount or level of UAV transport services is desired, an amount of time within a larger window of time, for which a certain amount or level of UAV transport services is desired. Other time parameters related to a request for UAV transport services are also possible.

Further, an item-provider submission may indicate the amount of UAV transport services being requested in various ways. For example, an item-provider submission may specify: (a) a scheduled and/or expected number of transport tasks that are desired during a future time period, (b) a scheduled and/or expected total flight time (across all transport tasks) for a future time period, (c) an expected or predicted average flight time for transport tasks during a future time period, and/or (d) a rate at which UAV transport services are desired (e.g., deliveries per hour or flight time per hour, during a time period longer than an hour), among other possibilities. (Note that in the foregoing examples, an item provider and/or an ATSP system may determine an expected number for an item provider based on historical transport data and/or other data.)

In some embodiments, an item-provider submission could specify multiple quantitative measures for a given time period. For example, an item-provider submission could provide a tiered offer for transport services. In such case, the item-provider submission might specify a first price for a certain amount of UAV transport services (e.g., for 10 flights) during a given time period, a second price for an additional amount of UAV transport services during the same time period (e.g., for 5 additional flights, after the first 10 flights), a third price for yet another additional amount of UAV transport services during the same time period (e.g., for 5 additional flights, after the first 15 flights), and so on. Other examples of item-provider submissions specifying multiple quantitative measures for the same time period are also possible.

In a further aspect, an item-provider submission may indicate quality-of-service (QoS) preferences or requirements for the UAV transport services being requested via the submission. For instance, an item-provider submission could specify time parameters for UAV transport service during a given time period, such as: (a) a preferred or required average time between requesting a UAV for a specific transport task and arrival of the UAV for item pick-up, across transport tasks during a given period of time, (b) a maximum time between requesting a UAV for a specific transport task and arrival of the UAV for item pick-up, during a given period of time, (c) a preferred or required average delivery fulfilment time (e.g., average time between requesting a UAV to deliver a given order and the delivery of the given order at the delivery location), and/or (d) a delivery fulfilment time during a given period of time, among other possibilities. Additionally or alternatively, an item-provider submission could specify preferred or required specifications for UAVs assigned to the item provider's transport requests. Examples of such desired UAV specifications include, but are not limited to, range, maximum speed, size, maneuverability specifications, maximum payload weight, and/or payload volume, among other possibilities.

B. Determining Performance Metrics

Various types of performance metrics and/or combinations of performance metrics may be determined at block 504.

In some cases, a performance metric may be indicative of a portion or portions of UAV transport tasks that are wholly or partly the responsibility of the item provider (e.g., parts of the delivery process that are not implemented by the ATSP). For example, when a UAV flies from an ATSP-operated UAV nest to a pick-up location specified by the item provider, the item provider may be responsible for loading the item or items for delivery on the UAV. (Note that herein, the act of loading an item "in the UAV", "on the UAV", or "to the UAV" can include attaching the items or a package with the items to the UAV's tether, placing the items into a tethered package, placing the items into a compartment in the UAV's body, or any other way of directly or indirectly securing the item(s) for delivery to the UAV for flight.) As such, the time between arrival of a UAV at the specified pick-up location and take-off from the pick-up location referred to herein as "loading time"), depends upon how quickly the item provider is able to load the item(s) to the UAV.

Accordingly, block 504 may involve determining a performance metric indicative of loading time during past UAV transport tasks involving the particular item provider, which may also be referred to as a "loading-time metric." For instance, the ATSP system may determine an average loading time across all previous UAV transport tasks involving the given item provider, or across a certain previous time period.

Further, in some cases, the ATSP could modify the loading-time metric for an item provider based on trends (e.g., upward or downward) in previous loading times. In such case, when a first item provider and a second item provider have the same average loading time during a given time period, but the first item provider has demonstrated improved loading time for more recent transport tasks during the time period as compared to the second item provider, the loading-time metric for the first item provider may be greater than the loading-time metric for the second item provider.

In a further aspect, block 504 could involve determining a loading-performance metric or metrics based on or indicative of procedural aspects of UAV transport tasks that are carried out by item providers. For example, an ATSP system could store data indicating whether an item provider successfully loads the correct item or items for each transport task, such that different item providers' numbers or rates of successfully item loading (e.g., successful fulfillment rates) can be compared. As another example, an ATSP system could store data indicating how well item loading rules and procedures are followed. In particular, an ATSP could maintain historical data indicating whether or not an item provider complies with item spacing and/or orientation parameters when loading items during each transport task. Additionally or alternatively, an ATSP could maintain historical data indicating whether or not an item provider performs certain notification or update procedures during each transport task (e.g., by sending a message or otherwise notifying the ATSP when items are loaded to the UAV and ready for delivery). Further, an ATSP could maintain Such historical data may then be used alone or in combination with other information to determine the performance metric. For instance, the ATSP could determine a score for the item provider, which generally is higher as the number or percentage of orders where proper procedure is followed increases, and vice versa. This score could itself be used as a performance metric, or could be combined with other factors to determine an overall performance metric for the item provider. Other techniques for determining a performance metric based on such loading-procedure data are also possible.

In yet another aspect, block 504 could involve determining a performance metric or metrics based on or indicative of feedback data from recipients of past UAV deliveries from the item provider. For instance, an ATSP could maintain data from past recipients indicating whether orders were fulfilled correctly. Such data could indicate, for each transport task, whether or not the item provider sent the correct items (as ordered), whether the items were packaged properly, the accuracy of the item provider's description of the ordered items (e.g., on an item provider's website or application), whether or not the ordered items were damaged when they arrived at the delivery location, and/or whether or not the item provider responded to customer questions or feedback, among other possibilities.

Such recipient feedback data may then be used alone or in combination with other information to determine a performance metric or metrics for a given item provider. For instance, the ATSP could determine a score for the item provider, which is generally higher as the number or percentage of orders with positive feedback increases, and vice versa. This score could itself be used as a performance metric, or could be combined with other factors to determine an overall performance metric for the item provider. Other techniques for determining a performance metric based on recipient feedback data are also possible.

In a further aspect, block 504 could involve determining a performance metric or metrics based on or indicative of how efficiently an item provider has utilized previously allocated UAV transport capacity. More specifically, in a scenario where UAV transport capacity is pre-allocated for an item provider based on an item-provider submission, UAVs may be moved to or otherwise stationed at a UAV nest or nests that are near to or co-located at a location designated by an item provider in advance of the time period specified by the item-provider submission (e.g., such that UAVs are readily available to provide the amount of service requested by the submission). However, for various reasons, there may be less deliveries than the item provider expected during the specified time period, such that the item provider does not utilize all of the capacity that was allocated to it for the time period.

In order to use its UAV fleet more efficiently (e.g., by decreasing ground time for UAVs), it may be advantageous for an ATSP to discourage "overbidding" on UAV capacity, and encourage item-provider submissions that more accurately reflect the amount of UAV capacity that will actually be utilized. Accordingly, block 504, could additionally or alternatively involve determining a performance metric based on or indicative of an item provider's historic utilization of allocated UAV transport capacity. For instance, the ATSP could determine a score for the item provider, which is generally higher as the percentage of allocated capacity that is utilized increases, and vice versa. This score could itself be used as a performance metric, or could be combined with other factors to determine an overall performance metric for the item provider. Other techniques for determining a performance metric based on efficiency of allocated-capacity usage are also possible.

C. Determining Comparative Measures for Item-Provider Submissions

At blocks 506, the comparative measure for a given item provider is determined based on the combination of (a) the quantitative measure for a given amount of UAV transport service (e.g., the amount of UAV transport capacity requested in the item provider submission), and (b) the performance metric or metrics determined at block 504. Further, it should be understood that other factors may also be considered in combination with the aforementioned factors.

Generally, the comparative measures could be scores, values, or any type of data that allows the item-provider submissions to be ranked at block 508. For instance, the ATSP may determine the comparative measure by using the performance metric or metrics to adjust a score corresponding to the quantitative measure indicated by the item provider submission.

In some embodiments, block 506 may involve determining respective quality scores for item providers based on a combination of two or more performance metrics for each item provider, including but not limited to combinations of the metrics noted herein. For example, two or more of the performance metrics described below may be separately calculated for a given item provider (such that each metric is represented as a quantitative value). The separate performance metrics for each item provider can then be summed, averaged, or mathematically combined in some other manner to calculate a quality score for the given item provider. Each item provider's quality score can then be utilized to determine a comparative measure for an item-provider submission received from the item provider, such that the performance and/or QoS of the corresponding item providers is accounted for when ranking item-provider submissions.

When the comparative measure for an item-provider submission takes the form of a "score", the quantitative measure indicated in item provider submission may be accounted for in various ways. When the item-provider submission is non-monetary and simply requests or estimates an amount of UAV capacity for a future time period, the scores for item-provider submission may generally be higher when the requested amount of UAV capacity is higher, and vice versa. (Note, however, that the ATSP may implement certain adjustment procedures and/or limits on requests in the interest of fairness, so as to avoid the scenario where an item provider requests more UAV transport capacity in an effort to rank higher, without having a realistic expectation that the extra capacity is actually needed.)

In other cases, when the quantitative measure is a monetary amount offered by the item provider for a certain amount of UAV capacity, the ATSP may determine a score for an item-provider submission that is generally higher when the monetary amount is higher, and vice versa. However, the item provider's score may be adjusted upward or downward based on a performance metric or metrics. In practice, this can result in allocation of some UAV transport capacity to item providers that are paying less than the amount or rate offered by other item providers, due to the consideration of the item providers' respective performance parameters.

To illustrate, consider the scenario where an ATSP determines a performance metric that is based on loading time data for some or all of the previous UAV transport service provided to a given item provider. In such embodiments, the ATSP can determine the comparative measure by adjusting an overall score for an item-provider submission so as to favor an item-provider submission from a first item provider over a submission from a second item provider, when the first item provider has better historical loading time data (e.g., lower average loading time). Additionally or alternatively, at block 506, the ATSP could adjust the comparative measures (e.g., the overall score) for item providers to: (a) favor item providers that have a greater number or percentage of orders where proper loading, delivery, communication, and/or reporting procedures are followed, (b) favor item providers having better recipient feedback data, and/or (c) favor item providers that have used their previously allocated UAV capacity more efficiently, among other possibilities.

In a further aspect of some embodiments, an ATSP could modify comparative measures for item providers based on trends (e.g., upward or downward) in one or more performance metrics. For example, when a first item provider and a second item provider have the same average loading time during a given time period, but the first item provider has demonstrated improved loading time for more recent transport tasks during the time period as compared to the second item provider, the loading-time metric for the first item provider may be greater than the loading-time metric for the second item provider. Other examples of trend-based adjustments to the comparative measures are also possible.

D. Ranking the Item-Provider Submissions and Distributing UAV Capacity

At block 508, the item-provider submissions may be ranked according to the comparative measure determined at block 506. For example, in an implementation where a higher comparative measure (e.g., a higher performance metric or quality score) is indicative of better performance and/or QoS by an item provider, the item-provider submissions may be ranked according to the comparative measures, from highest to lowest. In other implementations, where a lower comparative measure (e.g., a lower performance metric or quality score) is indicative of better performance and/or QoS by an item provider, the item-provider submissions may be ranked according to the comparative measures, from lowest to highest.

E. Determining the Geographic Distribution of UAVs

As noted above, an ATSP may implement an ongoing process to determine desired distributions of UAV capacity at future times based on time- and location-varying demand for UAV transport service (and/or perhaps other factors as well), and redistributing UAVs amongst UAV nests in an effort to achieve the desired distributions at those future times. Block 510 of method 500 may be a part of this ongoing process.

Generally, at block 510 the determined ranking may be utilized to determine a distribution of UAVs in any scenario where demand for UAV transport services from a group of item providers in a given area at a given time, exceeds the expected UAV capacity at that time. More specifically, demand for a given area having multiple item providers may be indicated by the collective amount of UAV transport services requested via item-provider submissions from these item providers (and perhaps other information as well) for a given time or time period. When the collective demand in the area exceeds the expected UAV capacity for that time or time period, then a performance-based ranking may be utilized to help determine how to distribute UAVs.

In exemplary embodiments, the determined ranking may be used to provide preferable service to higher ranking item providers. In particular, when demand exceeds UAV capacity, higher-ranking item providers will be more likely to have their requested allocation of UAV capacity met, than lower-ranking item providers. Accordingly, when necessary, UAVs may be instructed to relocate to a UAV nest or nests that serve a higher-ranking item provider, to the detriment of a lower-ranking item provider.

F. Methods Utilizing Performing-Metric Ranking to Distribute UAV Transport Capacity In some embodiments, an ATSP may rank item provider submissions according to one or more performance metrics, without consideration for the amount of UAV transport capacity requested, and/or without consideration for offer prices and/or rates from item providers. The performance-metric based ranking can then be used in conjunction with the amounts of UAV transport capacity requested by item providers and/or the prices or rates offered for the requested amounts of UAV capacity, to determine how to distribute UAVs amongst UAV nests.

Figure 6:
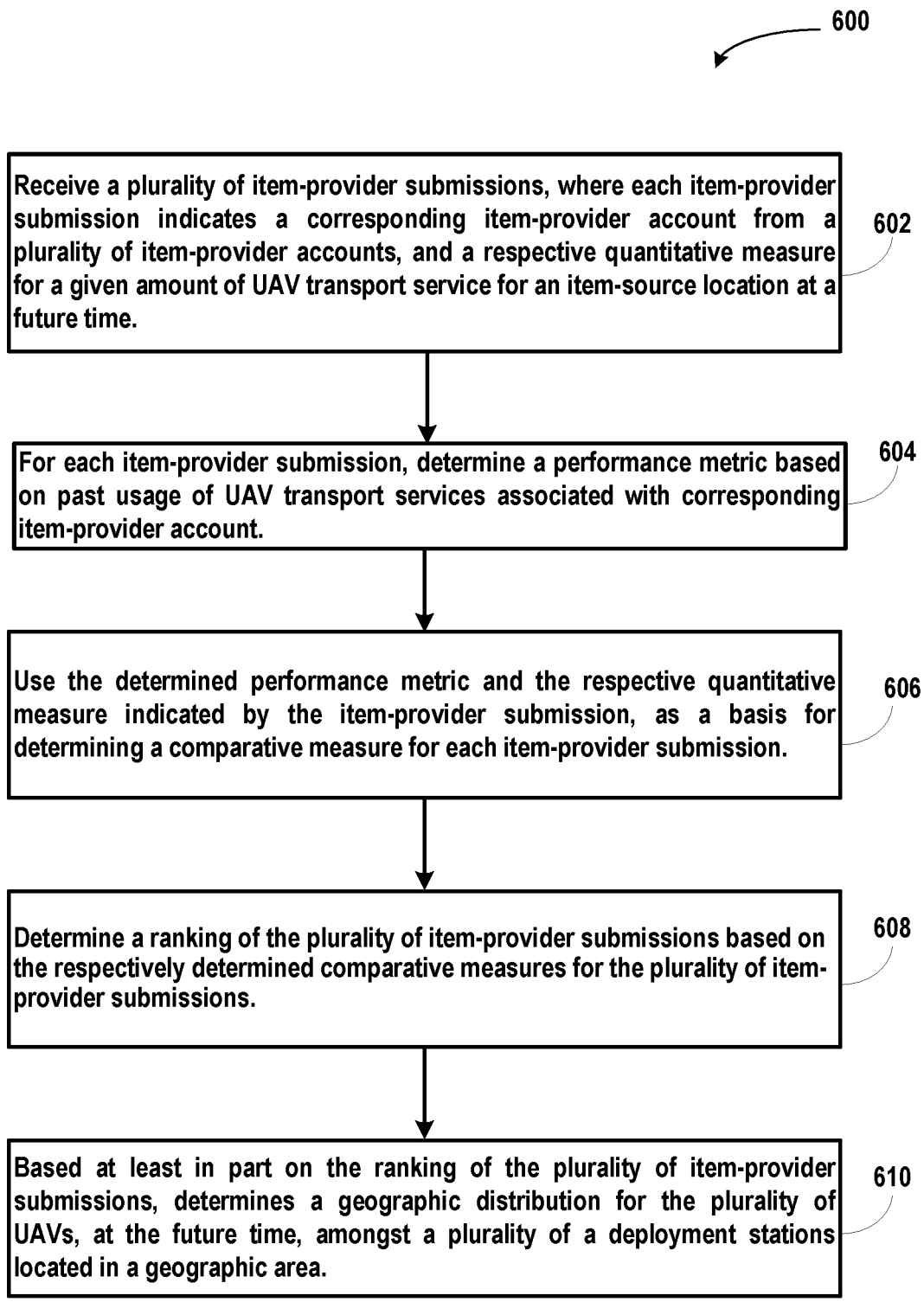
FIG. 6 is a flow chart illustrating another method for distributing unmanned aerial vehicles amongst a plurality of a deployment stations at different locations in a geographic area, according to exemplary embodiments.

For example, FIG. 6 is a flow chart illustrating another method 600 for distributing unmanned aerial vehicles amongst a plurality of a deployment stations at different locations in a geographic area, according to exemplary embodiments. Method 600 may be implemented by an ATSP in order to dynamically distribute and redistribute UAVs to various UAV hubs throughout a geographic area, based on item providers' performance metrics and demand for UAV transport services (and possibly other factors as well). Method 600 is described by way of example as being implemented by an ATSP's computing system. However, it should be understood that method 600 could be implemented by other types of computing systems or combinations of multiple computing systems, without departing from the scope of the invention.

As shown by block 602, method 600 involves an ATSP computing system: receiving a plurality of item-provider submissions, wherein each item-provider submission indicates a corresponding item-provider account from a plurality of item-provider accounts and an indication of an amount of unmanned aerial vehicle (UAV) transport service for an item-source location at a future time. The ATSP computing system then determines, for each item-provider submission, a performance metric based on past usage of UAV transport services associated with corresponding item-provider account, as shown by block 604. The ATSP computing system can then determine a ranking of the plurality of item-provider submissions based on the respectively determined performance metrics for the plurality of item-provider submissions, as shown by block 606. Then, based at least in part on the ranking of the plurality of item-provider submissions, the ATSP computing system determines a distribution of the plurality of UAVs, at the future time, amongst a plurality of deployment stations at different locations in the geographic area, as shown by block 608.

Note that block 602 may be implemented in the same or a similar manner as block 502 of method 500. Further, at block 604 of method 600, the performance metric or metrics for each item provider submission may be determined in the same or a similar manner as described in reference to block 504 of method 500.

At block 606, the item-provider submissions may be ranked according to the value of the performance metric determined at block 606. In implementations, where multiple performance metrics are determined for each item provider, the ATSP may use the combination of performance metrics to determine a quality score for each item provider as described above, and then rank item-provider submissions according to the quality scores for their respectively associated item provider.

At block 608, the performance-metric-based ranking may be utilized in various ways when determining the distribution of UAV transport capacity. In particular, the ATSP computing system may determine a geographic distribution of UAVs amongst UAV nests, such that the determined distribution favors higher-ranking item-provider submissions over lower-ranking item-provider submission (e.g., by prioritizing UAV assignments to UAV nests that serve the item providers having higher-ranking submissions).

VII. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
receiving, by a transport-provider computing system, a plurality of item-provider submissions, wherein each item-provider submission indicates a corresponding item-provider account and a quantitative measure for unmanned aerial vehicle (UAV) transport service for an item-source location at a future time;
for each item-provider submission:
(a) determining, by the transport-provider computing system, a performance metric based on past usage of UAV transport services associated with the corresponding item-provider account; and
(b) determining, by the transport-provider computing system, a comparative measure for the item-provider submission using both the performance metric and the quantitative measure indicated by the item-provider submission;
determining, by the transport-provider computing system, a ranking of the plurality of item-provider submissions based on the determined comparative measures for the plurality of item-provider submissions;
based at least in part on the ranking of the plurality of item-provider submissions, determining, by the transport-provider computing system, a distribution of a plurality of UAVs, at the future time, amongst a plurality of deployment stations at different locations in a geographic area; and
based on the determined distribution of the plurality of UAVs, dispatching, by the transport-provider computing system, the plurality of UAVs to the plurality of deployment stations, wherein dispatching the plurality of UAVs comprises operating one or more deployment systems to launch the plurality of UAVs to fly to the plurality of deployment stations.

2. The method of claim 1, wherein determining the distribution comprises prioritizing distributing the plurality of UAVs so as to provide UAVs for the UAV transport service indicated by higher ranking item-provider submissions.

3. The method of claim 1, wherein each of one or more of the plurality of item-provider submissions specifies one or more of the following types of information: (a) a number of transport tasks that are desired for the future time, (b) a total flight time requested for the future time, (c) an average flight time for transport tasks for the future time, or (d) a rate at which UAV transport services are desired for the future time.

4. The method of claim 1, wherein a respective quantitative measure indicated by each item-provider submission is a non-monetary value.

5. The method of claim 1, wherein each of one or more of the plurality of item-provider submissions specifies a plurality of quantitative measures for the future time, and wherein the plurality of quantitative measures collectively specify incremental values for tiers of UAV transport service.

6. The method of claim 1, wherein each of one or more of the plurality of item-provider submissions specifies one or more quality-of-service (QoS) parameters for requested UAV transport services, the one or more QoS parameters comprising one or more of the following: (a) an average time between requesting a UAV for a specific transport task and arrival of the requested UAV for item pick-up, (b) a maximum time between requesting a UAV for a specific transport task and arrival of the requested UAV for item pick-up, (c) an average delivery fulfillment time, or (d) a maximum delivery fulfillment time.

7. The method of claim 1, wherein determining the performance metric for each item-provider submission comprises determining at least one of: (a) a loading-time metric for the corresponding item-provider account or (b) a loading-performance metric for the corresponding item-provider account.

8. The method of claim 1, wherein determining the performance metric for each item-provider submission comprises using data indicating historic utilization of allocated UAV transport capacity by the corresponding item-provider account as a basis for determining the performance metric.

9. The method of claim 1, wherein determining the performance metric for each item-provider submission comprises using recipient feedback data associated with the corresponding item-provider account as a basis for determining the performance metric.

10. The method of claim 1, wherein determining the comparative measure for each item-provider submission comprises:
adjusting the quantitative measure indicated by the item-provider submission in accordance with the determined performance metric for the corresponding item-provider account.

11. The method of claim 1, wherein determining the performance metric for each item-provider submission comprises determining a plurality of performance metrics for the corresponding item-provider account, the method further comprising:
determining a quality score for each item-provider submission based on the quality score for the corresponding item-provider account.

12. The method of claim 11, wherein determining the comparative measure for each item-provider submission comprises:
using a combination of the quantitative measure indicated by the item-provider submission and the quality score for the corresponding item-provider account as a basis for determining an overall score for the item-provider submission.

13. The method of claim 12, wherein determining the ranking of the plurality of item-provider submissions comprises ranking the item-provider submissions according to their respectively determined overall scores.

14. The method of claim 1, wherein each item-provider submission indicates a quantitative measure for a specified amount of UAV transport service.

15. A transport-provider computing system comprising:
at least one communication interface operable to communicate with item-provider computing devices;
at least one processor; and
program instructions stored on a non-transitory computer readable medium and executable by the at least one processor to cause the transport-provider computing system to perform functions comprising:
receiving a plurality of item-provider submissions, wherein each item-provider submission indicates a corresponding item-provider account and a respective quantitative measure for unmanned aerial vehicle (UAV) transport service for an item-source location at a future time;
for each item-provider submission:
(a) determining a performance metric based on past usage of UAV transport services associated with the corresponding item-provider account; and
(b) determining a comparative measure for the item-provider submission using both the performance metric and the quantitative measure indicated by the item-provider submission;

determining a ranking of the plurality of item-provider submissions based on the determined comparative measures for the plurality of item-provider submissions;

based at least in part on the ranking of the plurality of item-provider submissions, determining a distribution of a plurality of UAVs, at the future time, amongst a plurality of deployment stations at different locations in a geographic area; and based on the determined distribution of the plurality of UAVs, dispatching the plurality of UAVs to the plurality of deployment stations, wherein dispatching the plurality of UAVs comprises operating one or more deployment systems to launch the plurality of UAVs to fly to the plurality of deployment stations.

16. The computing system of claim 15, wherein each of one or more of the plurality of item-provider submissions specifies one or more of: (a) a number of transport tasks that are desired for the future time, (b) a total flight time requested for the future time, (c) an average flight time for transport tasks for the future time, or (d) a rate at which UAV transport services are desired for the future time.

17. The computing system of claim 15, wherein determining the performance metric for each item-provider submission comprises determining a loading-time metric for the corresponding item-provider account.

18. The computing system of claim 15, wherein determining the comparative measure for each item-provider submission comprises:
adjusting the quantitative measure indicated by the item-provider submission in accordance with the determined performance metric for the corresponding item-provider account.

19. The computing system of claim 15, wherein determining the performance metric for each item-provider submission comprises determining a plurality of performance metrics for the corresponding item-provider account, and wherein the functions further comprise:
determining a quality score for each item-provider submission based on the quality score for the corresponding item-provider account.

20. A computer-implemented method comprising:
receiving, by a transport-provider computing system, a plurality of item-provider submissions, wherein each item-provider submission indicates a corresponding item-provider account and an amount of unmanned aerial vehicle (UAV) transport service for an item-source location at a future time;

for each item-provider submission, determining, by the transport-provider computing system, a performance metric based on past usage of UAV transport services associated with the corresponding item-provider account;

determining, by the transport-provider computing system, a ranking of the plurality of item-provider submissions based on the respectively determined performance metrics for the plurality of item-provider submissions;

based at least in part on the ranking of the plurality of item-provider submissions, determining, by the transport-provider computing system, a distribution of a plurality of UAVs, at the future time, amongst a plurality of deployment stations at different locations in a geographic area; and based on the determined distribution of the plurality of UAVs, dispatching, by the transport-provider computing system, the plurality of UAVs to the plurality of deployment stations, wherein dispatching the plurality of UAVs comprises operating one or more deployment systems to launch the plurality of UAVs to fly to the plurality of deployment stations.

21. The method of claim 20, wherein determining the performance metric for each item-provider submission comprises determining a plurality of performance metrics for the corresponding item-provider account, the method further comprising:
determining a quality score for each item-provider submission based on the quality score for the corresponding item-provider account.

22. The method of claim 21, wherein determining the ranking of the plurality of item-provider submissions comprises ranking the item-provider submissions according to their respectively determined quality scores.

23. The method of claim 22, wherein the plurality of UAVs collectively provide a UAV transport service capacity for the geographic area at the future time, and wherein determining the distribution of the plurality of UAVs comprises:
determining the distribution of the plurality of UAVs amongst a plurality of UAV nests in the geographic area at the future time, such that the determined distribution favors higher-ranking item-provider submissions over lower-ranking item-provider submission.

* * * * *